US009817873B2

(12) United States Patent
Cheng et al.

(10) Patent No.: US 9,817,873 B2
(45) Date of Patent: Nov. 14, 2017

(54) METHOD AND APPARATUS FOR MINING COMMUNITY USERS

(71) Applicant: Tencent Technology (Shenzhen) Company Ltd., Shenzhen (CN)

(72) Inventors: Gang Cheng, Shenzhen (CN); Xuan Pan, Shenzhen (CN); Ziming Zhuang, Shenzhen (CN); Jing Zhou, Shenzhen (CN); He Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/648,112

(22) PCT Filed: Nov. 18, 2013

(86) PCT No.: PCT/CN2013/087288
§ 371 (c)(1),
(2) Date: May 28, 2015

(87) PCT Pub. No.: WO2014/082535
PCT Pub. Date: Jun. 5, 2014

(65) Prior Publication Data
US 2015/0302062 A1   Oct. 22, 2015

(30) Foreign Application Priority Data

Nov. 29, 2012  (CN) .......................... 2012 1 0499292

(51) Int. Cl.
*G06F 17/30*   (2006.01)
(52) U.S. Cl.
CPC .... *G06F 17/30539* (2013.01); *G06F 17/3053* (2013.01); *G06F 17/30601* (2013.01); *G06F 17/30702* (2013.01); *G06F 17/30867* (2013.01)

(58) Field of Classification Search
None
See application file for complete search history.

(56) References Cited

U.S. PATENT DOCUMENTS

2009/0164926 A1   6/2009  Boyle et al.
2011/0282952 A1*  11/2011 Song ...................... G06Q 10/10
                                                                 709/206

(Continued)

FOREIGN PATENT DOCUMENTS

CN    101916256 A    12/2010
CN    102393843 A    3/2012
CN    102799625 A    11/2012

OTHER PUBLICATIONS

Written Opinion (English translation), International Application No. PCT/CN2013/087288, dated Jan. 30, 2014.

(Continued)

*Primary Examiner* — Amresh Singh
(74) *Attorney, Agent, or Firm* — Marshall, Gerstein & Borun LLP

(57) ABSTRACT

The present disclosure discloses a method and apparatus for mining community users, belonging to the field of Internet communications. The method includes: acquiring original community data of a community user; calculating intimacy scores of the community user with respect to other community users according to the original community data of the community user, the intimacy scores being used for indicating degrees of intimacy of the community user with respect to the other community users; clustering the community users according to the intimacy scores of the community user with respect to the other community users, and forming a community user circle; and displaying the community user circle to community users in the community user circle, so that the community users in the community user circle communicate with each other. The apparatus (Continued)

includes: a first acquiring module, a calculation module, a clustering module, and a display module.

9 Claims, 7 Drawing Sheets

(56) References Cited

U.S. PATENT DOCUMENTS

| | | | |
|---|---|---|---|
| 2012/0011204 A1 | 1/2012 | Morin et al. | |
| 2013/0166574 A1* | 6/2013 | Kang | G06Q 30/02 |
| | | | 707/749 |
| 2014/0067967 A1* | 3/2014 | Jackson | G06Q 50/01 |
| | | | 709/206 |
| 2014/0324539 A1 | 10/2014 | Liu et al. | |

OTHER PUBLICATIONS

International Search Report from International Application No. PCT/CN2013/087288 dated Jan. 30, 2014.

Zhumin et al., "Blog Community Discovery Based on PCM Clustering Algorithm", Journal of Xiamen University (Natural Science), vol. 48, No. 4, Jul. 2009, 6 pages.

Office Action in CN Application No. 201210499292.9 dated Aug. 16, 2017, 6 pages.

\* cited by examiner

METHOD AND APPARATUS FOR MINING COMMUNITY USERS

RELATED APPLICATIONS

This application claims priority to Chinese Patent Application No. 2012104992929, filed with the Chinese Patent Office on Nov. 29, 2012 and entitled "METHOD AND APPARATUS FOR MINING COMMUNITY USERS", which is incorporated herein by reference in its entirety.

FIELD OF THE TECHNOLOGY

The present disclosure relates to the field of Internet communications, and in particular, to a method and an apparatus for mining community users.

BACKGROUND OF THE DISCLOSURE

With the development of community technologies, communities are used by a wide range of users. A user may register a community account in a community and add friends to the community account, and then interact with the friends in many interaction manners, for example, using the community account to send a private message to a friend, forward information posted by a friend and/or comment on information posted by a friend.

At present, in the community, the user can find friends included in the community account of the user, while friends included in the community account cannot find each other; as a result, the user can interact with the friends included in the community account, but the friends included in the community account cannot interact with each other. In addition, the user can only interact with the friends included in the community account, but cannot interact with users not included in the community account, which leads to poor interactivity of the community.

SUMMARY

To help a community user interact with other users in addition to friends in a community account of the community user and improve the interactivity, the present disclosure provides a method and an apparatus for mining community users. The technical solutions are as follows:

A method for mining community users includes:
acquiring original community data of a community user, the original community data of the community user including attention information of the community user with respect to other community users and the number of topics in which the community user and the other community users are all interested;

calculating intimacy scores of the community user with respect to the other community users according to the original community data of the community user, the intimacy scores being used for indicating degrees of intimacy of the community user with respect to the other community users;

clustering the community users according to the intimacy scores of the community user with respect to the other community users, and forming a community user circle; and displaying the community user circle to community users in the community user circle, so that the community users in the community user circle communicate with each other.

The calculating intimacy scores of the community user with respect to the other community users according to the original community data of the community user includes:

calculating attention scores of the community user with respect to the other community users according to the attention information of the community user with respect to the other community users;

calculating topic-of-focus scores between the community user and the other community users according to the number of topics in which the community user and the other community users are all interested; and calculating the intimacy scores of the community user with respect to the other community users according to the attention scores of the community user with respect to the other community users and the topic-of-focus scores between the community user and the other community users.

The clustering the community users according to the intimacy scores of the community user with respect to the other community users, and forming a community user circle includes:

scanning a community user;
calculating, according to intimacy scores of the scanned community user with respect to other community users except the scanned community user and intimacy scores of the other community users with respect to the scanned community user, user distances between the scanned community user and the other community users; and selecting a community user whose user distance to the scanned community user is less than a preset user distance threshold, and clustering the scanned community user and the selected community user to form a community user circle.

After the clustering the scanned community user and the selected community user to form a community user circle, the method further includes:

forming a circle set of all community user circles, setting a pointer to point to the first community user circle in the circle set, and starting scan from the first community user circle among remaining community user circles in the circle set;

calculating a circle distance between the community user circle pointed to by the pointer and the scanned community user circle according to intimacy scores of community users in the community user circle pointed to by the pointer with respect to community users in the scanned community user circle and degrees of intimacy of the community users in the scanned community user circle with respect to the community users in the community user circle pointed to by the pointer; and merging the community user circle pointed to by the pointer and the scanned community user circle if the circle distance is less than a preset circle distance threshold.

After the merging the community user circle pointed to by the pointer and the scanned community user circle, the method further includes:

setting the pointer to point to a next community user circle in the circle set if the community user circle pointed to by the pointer is not the last community user circle in the circle set, and starting scan from the first community user circle among remaining community user circles in the circle set.

If the circle distance is greater than or equal to the preset circle distance threshold, the method further includes:
scanning a next community user circle among remaining community user circles in the circle set if the scanned community user circle is not the last community user circle among the remaining community user circles in the circle set; and setting the pointer to point to a next community user circle in the circle set if the scanned community user circle is the last community user circle among the remaining community user circles in the circle set and the community user circle pointed to by the pointer is not the last community user circle in the circle set, and starting scan from the first community user circle among the remaining community user circles in the circle set.

The clustering the community users according to the intimacy scores of the community user with respect to the other community users, and forming a community user circle includes:

first step: scanning a community user, forming a first user set of the other community users, and calculating user distances between the scanned community user and the community users in the first user set according to intimacy scores of the scanned community user with respect to the community users in the first user set and intimacy scores of the community users in the first user set with respect to the scanned community user;

second step: selecting, from the first user set, a community user having a smallest user distance to the community user, clustering the community user and the selected community user to form a second user set, acquiring the number of edges between each unselected community user in the first user set and the second user set, selecting a community user having a largest number of edges with the second user set, and counting the number of community users having a largest number of edges;

third step: adding the community user having a largest number of edges to the second user set if the number obtained through count is not zero, calculating the number of edges between any community user in the second user set and each of other community users in the second user set, selecting a community user having a smallest number of edges, and removing the community user having a smallest number of edges from the second user set if the number of community users having a smallest number of edges is less than half of the number obtained through count; and fourth step: judging the number of community users in the second user set, and clustering the community users in the second user set to form a community user circle if the number of community users in the second user set is greater than or equal to a preset first threshold and is less than or equal to a preset second threshold.

If the number of community users in the second user set is less than the preset first threshold, the method further includes:

acquiring the number of edges between each unselected community user in the first user set and the second user set, selecting a community user having a largest number of edges with the second user set, counting the number of community users having a largest number of edges, clustering the community users in the second user set to form a community user circle if the number obtained through count is zero, or executing the third step and fourth step if the number obtained through count is not zero.

If the number of community users in the second user set is greater than the preset second threshold, the method further includes:

calculating the number of edges between any community user in the second user set and each of other community users in the second user set, selecting a community user having a smallest number of edges and removing the selected community user from the second user set; and repeating the foregoing process if the number of community users in the second user set is greater than the preset second threshold, until the number of community users in the second user set is less than or equal to the preset second threshold, and clustering the community users in the second user set to form a community user circle.

After the clustering the community users in the second user set to form a community user circle, the method further includes:

acquiring same community users from a first community user circle and a second community user circle, where the first community user circle and the second community user circle are any two community user circles, calculating a first percentage that the acquired community users account for in the first community user circle and a second percentage that the acquired community users account for in the second community user circle, and merging the first community user circle and the second community user circle if the first percentage and/or the second percentage is greater than a preset percentage.

After the clustering the community users and forming a community user circle, the method further includes:

acquiring community topics in which community users in the community user circle are interested, counting the number of community users interested in each community topic in the community user circle, selecting a preset number of community topics in which a largest number of community users is interested, and determining the selected one or more community topics as an attribute of the community user circle.

An apparatus for mining community users includes:

a first acquiring module, configured to acquire original community data of a community user, the original community data of the community user including attention information of the community user with respect to other community users and the number of topics in which the community user and the other community users are all interested;

a calculation module, configured to calculate intimacy scores of the community user with respect to the other community users according to the original community data of the community user, the intimacy scores being used for indicating degrees of intimacy of the community user with respect to the other community users;

a clustering module, configured to cluster the community users according to the intimacy scores of the community user with respect to the other community users, and form a community user circle; and a display module, configured to display the community user circle to community users in the community user circle, so that the community users in the community user circle communicate with each other.

The calculation module includes:

a first calculation unit, configured to calculate attention scores of the community user with respect to the other community users according to the attention information of the community user with respect to the other community users;

a second calculation unit, configured to calculate topic-of-focus scores between the community user and the other community users according to the number of topics in which the community user and the other community users are all interested; and a third calculation unit, configured to calculate the intimacy scores of the community user with respect to the other community users according to the attention scores of the community user with respect to the other community users and the topic-of-focus scores between the community user and the other community users.

The clustering module includes:

a first scan unit, configured to scan a community user;

a fourth calculation unit, configured to calculate, according to intimacy scores of the scanned community user with respect to other community users except the scanned community user and intimacy scores of the other community users with respect to the scanned community user, user distances between the scanned community user and the other community users; and a first clustering unit, configured to select a community user whose user distance to the scanned community user is less than a preset user distance threshold, and cluster the scanned community user and the selected community user to form a community user circle.

The apparatus further includes:

a first merging module, configured to form, after the scanned community user and the selected community user are clustered to form a circle, a circle set of all community user circles, set a pointer to point to the first community user circle in the circle set, and start scan from the first community user circle among remaining community user circles in the circle set;

calculating a circle distance between the community user circle pointed to by the pointer and the scanned community user circle according to intimacy scores of community users in the community user circle pointed to by the pointer with respect to community users in the scanned community user circle and degrees of intimacy of the community users in the scanned community user circle with respect to the community users in the community user circle pointed to by the pointer; and merging the community user circle pointed to by the pointer and the scanned community user circle if the circle distance is less than a preset circle distance threshold.

The apparatus further includes:

a first scan module, configured to set the pointer to point to a next community user circle in the circle set if the community user circle pointed to by the pointer is not the last community user circle in the circle set, and start scan from the first community user circle among remaining community user circles in the circle set.

The apparatus further includes:

a second scan module, configured to scan a next community user circle among the remaining community user circles in the circle set if the circle distance is greater than or equal to the preset circle distance threshold and the scanned community user circle is not the last community user circle among the remaining community user circles in the circle set; and a third scan module, configured to set the pointer to point to a next community user circle in the circle set if the circle distance is greater than or equal to the preset circle distance threshold, the scanned community user circle is the last community user circle among the remaining community user circles in the circle set, and the community user circle pointed to by the pointer is not the last community user circle in the circle set, and start scan from the first community user circle among the remaining community user circles in the circle set.

The clustering module includes:

a second scan unit, configured to scan a community user, form a first user set of the other community users, and calculate user distances between the scanned community user and the community users in the first user set according to intimacy scores of the scanned community user with respect to the community users in the first user set and intimacy scores of the community users in the first user set with respect to the scanned community user;

a first selection unit, configured to select, from the first user set, a community user having a smallest user distance to the community user, cluster the community user and the selected community user to form a second user set, acquire the number of edges between each unselected community user in the first user set and the second user set, select a community user having a largest number of edges with the second user set, and count the number of community users having a largest number of edges;

a second selection unit, configured to add the community user having a largest number of edges to the second user set if the number obtained through count is not zero, calculate the number of edges between any community user in the second user set and each of other community users in the second user set, select a community user having a smallest number of edges, and remove the community user having a smallest number of edges from the second user set if the number of community users having a smallest number of edges is less than half of the number obtained through count; and a second clustering unit, configured to judge the number of community users in the second user set, and cluster the community users in the second user set to form a community user circle if the number of community users in the second user set is greater than or equal to a preset first threshold and is less than or equal to a preset second threshold.

The clustering module further includes:

a third clustering unit, configured to acquire the number of edges between each unselected community user in the first user set and the second user set if the number of community users in the second user set is less than the preset first threshold, select a community user having a largest number of edges with the second user set, count the number of community users having a largest number of edges, cluster the community users in the second user set to form a community user circle if the number obtained through count is zero, or execute the steps of the second selection unit and the second clustering unit if the number obtained through count is not zero.

The clustering module further includes:

a fourth clustering unit, configured to calculate the number of edges between any community user in the second user set and each of other community users in the second user set if the number of community users in the second user set is greater than the preset second threshold, select a community user having a smallest number edges and remove the selected community user from the second user set; repeat the foregoing process if the number of community users in the second user set is greater than the preset second threshold, until the number of community users in the second user set is less than or equal to the preset second threshold, and cluster the community users in the second user set to form a community user circle.

The apparatus further includes:

a second merging module, configured to acquire same community users from a first community user circle and a second community user circle after the community users in the second user set are clustered to form a community user circle, where the first community user circle and the second community user circle are any two community user circles, calculate a first percentage that the acquired community users account for in the first community user circle and a second percentage that the acquired community users account for in the second community user circle, and merge the first community user circle and the second community user circle if the first percentage and/or the second percentage is greater than a preset percentage.

The apparatus further includes:

a second acquiring module, configured to acquire, after the community users are clustered to form the community user circle, community topics in which the community users in the community user circle are interested, count the number of community users interested in each community topic in the community user circle, select a preset number of community topics having a largest number of community users, and determine the selected one or more community topics as an attribute of the community user circle.

In embodiments of the present invention, original community data of a community user is acquired, intimacy scores of the community user with respect to other community users are calculated according to the original community data, and then a community user circle is formed by clustering the community users according to the intimacy scores and is displayed to each community user in the community user circle. The community user circle is formed according to the intimacy scores, the community users in the community user circle are community users having a high degree of intimacy, and the community users are willing to interact and communicate with each other. Moreover, for any community user in the community user circle, community users in the community user circle may be community users other than friends that the community user follows, so that the community user can interact with other community users in addition to the friends followed, which improves the interactivity of a community.

DESCRIPTION OF EMBODIMENTS

To make the objectives, the technical solutions, and advantages of the present disclosure clearer, the implementation manners of the present disclosure will be described in more detail below with reference to the accompanying drawings.

Embodiment 1

Figure 1:
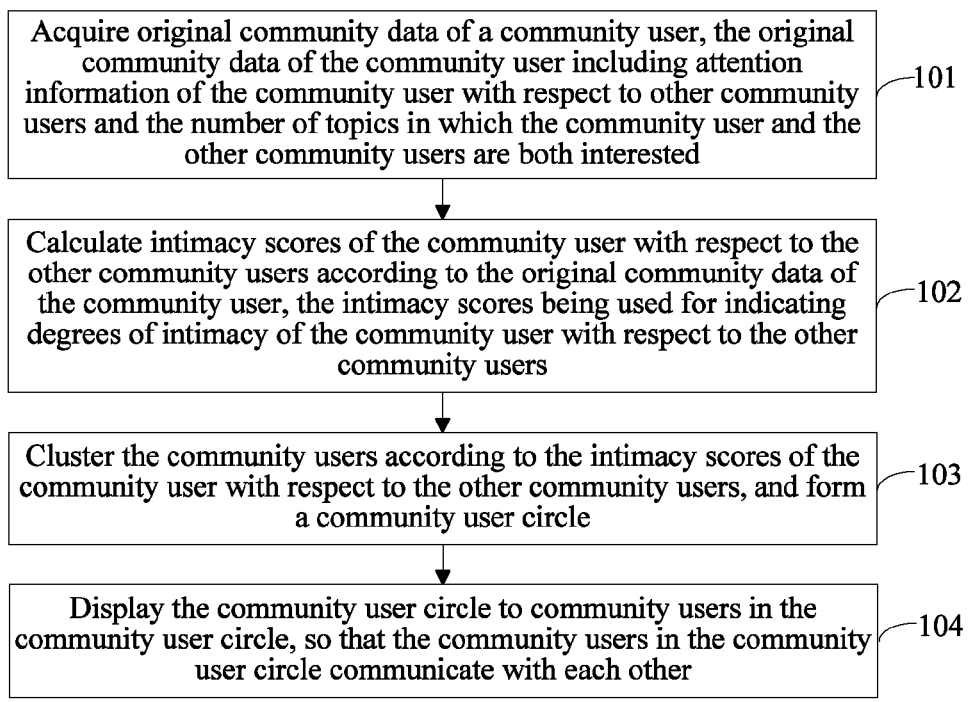
FIG. 1 is a method for mining community users according to Embodiment 1 of the present invention.

This embodiment of the present invention provides a method for mining community users; referring to FIG. 1, the method includes:

Step 101: Acquire original community data of a community user, the original community data of the community user including attention information of the community user with respect to other community users and the number of topics in which the community user and the other community users are all interested.

Step 102: Calculate intimacy scores of the community user with respect to the other community users according to the original community data of the community user, the intimacy scores being used for indicating degrees of intimacy of the community user with respect to the other community users.

Step 103: Cluster the community users according to the intimacy scores of the community user with respect to the other community users, and form a community user circle.

Step 104: Display the community user circle to community users in the community user circle, so that the community users in the community user circle communicate with each other.

In this embodiment of the present invention, the community may be Microblog, a forum, or a network zone.

In this embodiment of the present invention, original community data of a community user is acquired, intimacy scores of the community user with respect to other community users are calculated according to the original community data, and then a community user circle is formed by clustering the community users according to the intimacy scores and is displayed to each community user in the community user circle. The community user circle is formed according to the intimacy scores, the community users in the community user circle are community users having a high degree of intimacy, and the community users are willing to interact and communicate with each other. Moreover, for any community user in the community user circle, community users in the community user circle may be community users other than friends that the community user follows, so that the community user can interact with other community users in addition to the friends followed, which improves the interactivity of a community.

Embodiment 2

Figure 2:
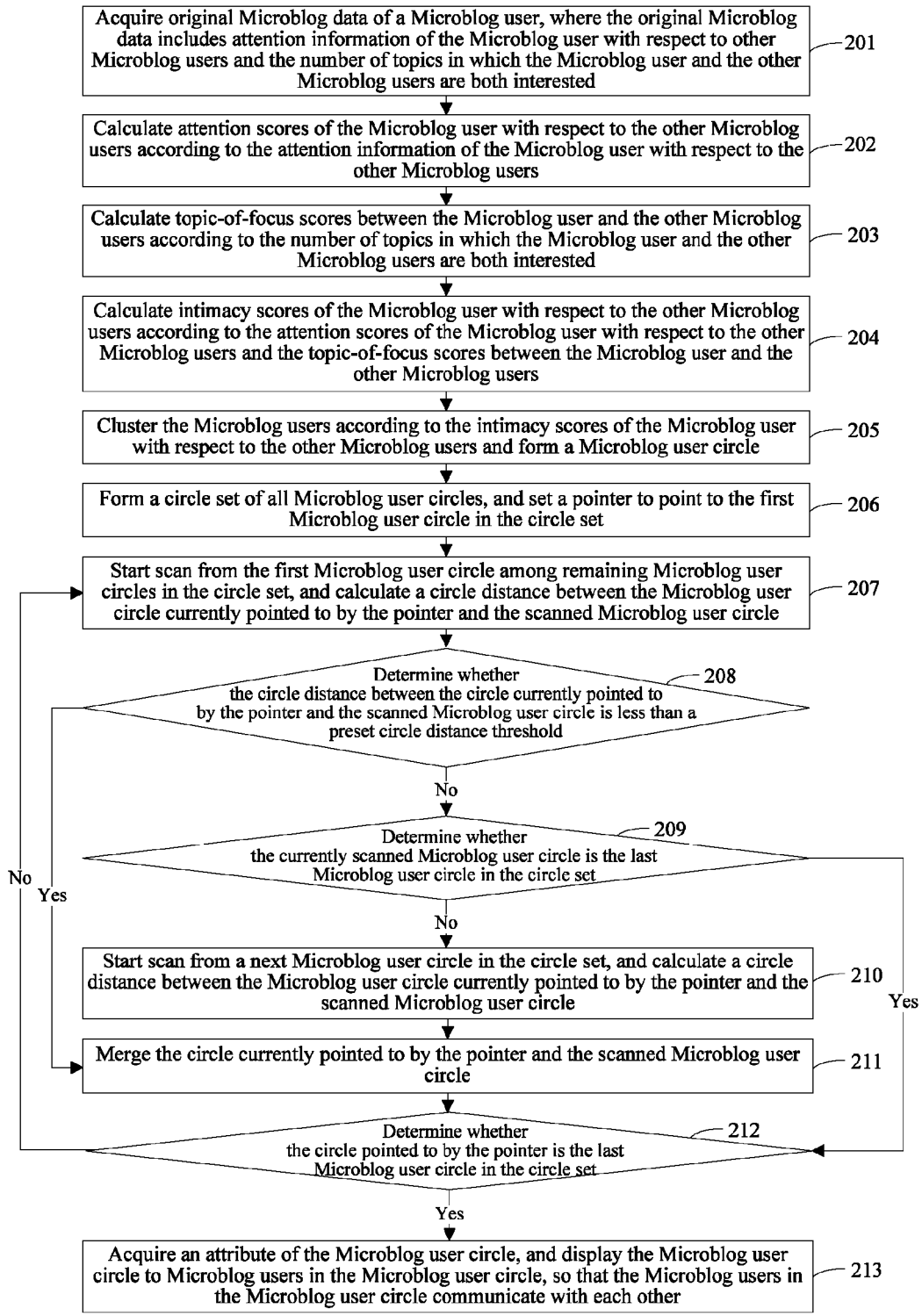
FIG. 2 is a method for mining community users according to Embodiment 2 of the present invention.

This embodiment of the present invention provides a method for mining community users. In this embodiment of the present invention, an example in which Microblog serves as the community is used for description, and the method provided in this embodiment of the present invention is used to mine Microblog users. Referring to FIG. 2, the method includes:

Step 201: Acquire original Microblog data of a Microblog user, where the original Microblog data includes attention information of the Microblog user with respect to other Microblog users and the number of topics in which the Microblog user and the other Microblog users are all interested.

Specifically, the attention information of the Microblog user with respect to other Microblog users and the number of topics in which the Microblog user and the other Microblog users are all interested are acquired.

The attention information of the Microblog user with respect to other Microblog users includes: follow information of the Microblog user, the number of times the Microblog user forwards Microblog posts of the other Microblog users, the number of times the Microblog user comments on Microblog posts of the other Microblog users, the number of times the Microblog user sends information to the other Microblog users and/or the number of times the Microblog user sends private messages to the other Microblog users.

The follow information of the Microblog user includes identifiers of other Microblog users that the Microblog user follows.

In this embodiment of the present invention, a Microblog server stores follow information of each Microblog user, the number of times each Microblog user forwards Microblog posts of other Microblog user, the number of times each Microblog user comments on Microblog posts of other Microblog users, the number of times each Microblog user sends information to other Microblog users, the number of times each Microblog user sends private messages to other Microblog users, and Microblog topics in which each Microblog user is interested Therefore, in this embodiment of the present invention, for any Microblog user, follow information of the Microblog user, the number of times the Microblog user forwards Microblog posts of other Microblog users, the number of times the Microblog user comments on Microblog posts of other Microblog users, the number of times the Microblog user sends information to other Microblog users and/or the number of times the Microblog user sends private messages to other Microblog users and/or Microblog topics in which the Microblog user is interested may be acquired from the Microblog server, and Microblog topics in which the Microblog user and other Microblog users are both interested are acquired according to the Microblog topics in which the Microblog user is interested and Microblog topics in which other Microblog users are interested.

Step 202: Calculate attention scores of the Microblog user with respect to the other Microblog users according to the attention information of the Microblog user with respect to the other Microblog users.

The attention scores of the Microblog user with respect to the other Microblog users include: follow information scores of the Microblog user with respect to the other Microblog users, forwarding and commenting scores regarding forwarding of and comment on Microblog posts of the other Microblog users by the Microblog user, information sending scores regarding sending of information by the Microblog user to the other Microblog users, and/or private message sending scores regarding sending of private messages by the Microblog user to the other Microblog users.

Calculating follow information scores of the Microblog user with respect to the other Microblog users according to the follow information of the Microblog user may be:

calculating follow scores of the Microblog user with respect to the other Microblog users according to the follow information of the Microblog user with respect to the other Microblog users and formula (1):

$$z(i, j) = \begin{cases} 1 \\ 0 \end{cases} \quad (1)$$

where $z(i,j)$ is a function about a follow information score of a Microblog user with respect to another Microblog user, i is the Microblog user, j is another Microblog user except the Microblog user, if the Microblog user i follows the Microblog user j, $z(i,j)=1$, or if the Microblog user i does not follow the Microblog user j, $z(i,j)=0$.

Calculating, according to the number of times the Microblog user forwards Microblog posts of the other Microblog users and the number of times the Microblog user comments on Microblog posts of the other Microblog users, forwarding and commenting scores regarding forwarding of and comment on Microblog posts of the other Microblog users by the Microblog user may be:

calculating, according to the number of times the Microblog user forwards Microblog posts of the other Microblog users, the number of times the Microblog user comments on Microblog posts of the other Microblog users, and formula (2), forwarding and commenting scores regarding forwarding of and comment on Microblog posts of the other Microblog users by the Microblog user:

$$f(i,j)=x+y \quad (2)$$

where $f(i,j)$ is a function about a forwarding and commenting score regarding forwarding of and comment on Microblog posts of another Microblog user by a Microblog user, i is the Microblog user, j is another Microblog user except the Microblog user, x is the number of times the Microblog user i forwards Microblog posts of the Microblog user j, and y is the number of times the Microblog user i comments on Microblog posts of the Microblog user j.

Calculating, according to the number of times the Microblog user sends information to the other Microblog users, information sending scores regarding sending of information by the Microblog user to the other Microblog users may be:

calculating, according to the number of times the Microblog user sends information to the other Microblog users and formula (3), information sending scores regarding sending of information by the Microblog user to the other Microblog users:

$$g(i,j)=x \quad (3)$$

where $g(i,j)$ is a function about the number of times a Microblog user sends information to another Microblog user, i is the Microblog user, j is another Microblog user except the Microblog user, x is the number of times the Microblog user i sends information to the Microblog user j.

Calculating, according to the number of times the Microblog user sends private messages to the other Microblog users, private message sending scores regarding sending of private messages by the Microblog user to the other Microblog users may be: calculating, according to the number of times the Microblog user sends private messages to the other Microblog users and formula (4), private message sending scores regarding sending of private messages by the Microblog user to the other Microblog users:

$$h(i,j)=x \quad (4)$$

where $h(i,j)$ is a function about the number of times a Microblog user sends private messages to another Microblog user, i is the Microblog user, j is another Microblog user except the Microblog user, and x is the number of times the Microblog user i sends private messages to the Microblog user j.

Step 203: Calculate topic-of-focus scores between the Microblog user and the other Microblog users according to the number of topics in which the Microblog user and the other Microblog users are all interested.

Specifically, the topic-of-focus scores between the Microblog user and the other Microblog users are calculated according to the number of topics in which the Microblog user and the other Microblog users are all interested and formula (5).

$$l(i,j,x)=x \quad (5)$$

where $l(i,j,x)$ is a function about a topic-of-focus score between a Microblog user and another Microblog user, i is the Microblog user, j is another Microblog user except the Microblog user, and x is the number of topics in which the Microblog user i and the Microblog user j are both interested.

Step 204: Calculate intimacy scores of the Microblog user with respect to the other Microblog users according to the attention scores of the Microblog user with respect to the other Microblog users and the topic-of-focus scores between the Microblog user and the other Microblog users.

The intimacy scores are used for indicating degrees of intimacy of the Microblog user with respect to the other Microblog users.

Specifically, the intimacy scores of the Microblog user with respect to the other Microblog users are calculated according to the attention scores of the Microblog user with respect to the other Microblog users, the topic-of-focus scores between the Microblog user and the other Microblog users, and formula (6).

$$\text{dis\_score}(i, j) = \frac{1}{\alpha * z(i, j) + \beta * f(i, j) + \gamma * g(i, j) + \delta * h(i, j) + \varepsilon * l(i, j)} \quad (6)$$

where dis_score(i,j) is a function about an intimacy score of a user with respect to another Microblog user, i is the Microblog user, j is another Microblog user except the Microblog user, z(i, j) is a function about attention information, f(i, j) is a function about a Microblog post forwarding and commenting score, g(i, j) is a function about an information sending score, h(i, j) is a function about a private message sending score, l(i, j, x) is a function about a topic-of-focus score, and $\alpha+\beta+\gamma+\delta+\varepsilon=1$; the value of one or more of $\alpha, \beta, \gamma, \delta$, and $\varepsilon$ may be set to zero, and when the value is set to zero, it is unnecessary to calculate the score in the related function.

A smaller intimacy score of a Microblog user with respect to another Microblog user indicates that the Microblog user is more intimate with the another Microblog user, and a larger intimacy score indicates that the Microblog user is less intimate with the another Microblog user.

For example, original Microblog data of a Microblog user i with respect to a Microblog user j, original Microblog data of the Microblog user j with respect to the Microblog user i, and related function scores are shown in Table 1 below.

It can be seen that the intimacy score of the Microblog user i with respect to the Microblog user j is less than the intimacy score of the Microblog user j with respect to the Microblog user i, which indicates that the Microblog user i is more intimate with the Microblog user j than the Microblog user j is with the Microblog user i.

Step 205: Cluster the Microblog users according to the intimacy scores of the Microblog user with respect to the other Microblog users and form a Microblog user circle.

Specifically, this step may specifically include the following step (1) to step (4):

(1): Scan a Microblog user.

(2): Calculate, according to intimacy scores of the scanned Microblog user with respect to other Microblog users except the scanned Microblog user and intimacy scores of the other Microblog users with respect to the scanned Microblog user, user distances between the scanned Microblog user and the other Microblog users.

(3): Select a Microblog user whose user distance to the scanned Microblog user is less than a preset user distance threshold, and cluster the scanned Microblog user and the selected Microblog user to form a Microblog user circle.

The calculating user distances between the scanned Microblog user and the other Microblog users may be: calculating, according to the intimacy scores of the scanned Microblog user with respect to other Microblog users except the scanned Microblog user, the intimacy scores of the other Microblog users with respect to the scanned Microblog user, and formula (7), user distances between the scanned Microblog user and the other Microblog users:

$$\text{dis}(i,j) = \text{dis\_score}(i,j) * \text{dis\_score}(j,i) \quad (7)$$

where dis(i,j) is a function for a user distance from a Microblog user to another Microblog user, i is the Microblog

TABLE 1

| Microblog user | Follow information | Number of times the Microblog user comments on Microblog posts of another Microblog user | Number of times the Microblog user forwards Microblog posts of another Microblog user | Number of times the Microblog user sends information to another Microblog user | Number of times the Microblog user sends private messages to another Microblog user | Topics of shared interest |
|---|---|---|---|---|---|---|
| Microblog user i | Yes | 10 | 5 | 7 | 3 | 5 |
| Microblog user j | Yes | 5 | 6 | 3 | 1 | 5 |
| (i, j) | 1 | | 15 | 7 | 3 | 5 |
| (j, i) | 1 | | 11 | 3 | 1 | 5 |

According to the original Microblog data, an intimacy score of the Microblog user i with respect to the Microblog user j is calculated as follows:

$$\text{dis\_score}(i, j) = \frac{1}{0.2*1 + 0.2*(10+5) + 0.2*7 + 0.2*3 + 0.2*5} = 0.1612;$$

An intimacy score of the Microblog user j with respect to the Microblog user i is calculated as follows:

$$\text{dis\_score}(i, j) = \frac{1}{0.2*1 + 0.2*(5+6) + 0.2*3 + 0.2*1 + 0.2*5} = 0.2381;$$

user, j is another Microblog user except the Microblog user, dis_score(i, j) is an intimacy score of the Microblog user i with respect to the Microblog user j, and dis_score(j,i) is an intimacy score of the Microblog user j with respect to the Microblog user i. The value of the preset user distance threshold is set according to an actual situation, and is less than 1; the smaller the preset user distance threshold is, the smaller the circle is.

(4) Scan a next Microblog user if some Microblog user is not scanned yet, and return to step (2), or end the process if all Microblog users have been scanned.

Correspondingly, the foregoing operations are performed on all Microblog users on a Microblog network, and two Microblog users having a user distance less than the preset user distance threshold are clustered to form a Microblog user circle.

Step 206: Form a circle set of all Microblog user circles, and set a pointer to point to the first Microblog user circle in the circle set.

Step 207: Start scan from the first Microblog user circle among remaining Microblog user circles in the circle set, and calculate a circle distance between the Microblog user circle currently pointed to by the pointer and the scanned Microblog user circle.

Specifically, the circle distance between the circle currently pointed to by the pointer and the scanned Microblog user circle is calculated according to intimacy scores of Microblog users in the Microblog user circle currently pointed to by the pointer with respect to Microblog users in the scanned Microblog user circle, degrees of intimacy of the Microblog users in the scanned Microblog user circle with respect to the Microblog users in the Microblog user circle currently pointed to by the pointer, and formula (8):

$$C\_dis(I,J) = \Sigma_0{}^n dis\_score(i,j) * dis\_score(j,i) \quad (8)$$

where c_dis(I,J) is a function for a circle distance between two Microblog user circles, I is a Microblog user circle currently pointed to by a pointer, J is a scanned Microblog user circle, i and j are two different Microblog users, the Microblog user i belongs to the Microblog user circle I, the Microblog user j belongs to the Microblog user circle J, and n is the number of Microblog users in a Microblog user circle.

Step 208: Determine whether the circle distance between the circle currently pointed to by the pointer and the scanned Microblog user circle is less than a preset circle distance threshold, execute step 211 if the circle distance between the circle currently pointed to by the pointer and the scanned Microblog user circle is less than the preset circle distance threshold, or execute step 209 if the circle distance between the circle currently pointed to by the pointer and the scanned Microblog user circle is greater than or equal to the preset circle distance threshold.

Step 209: Determine whether the currently scanned Microblog user circle is the last Microblog user circle in the circle set, execute step 212 if the currently scanned Microblog user circle is the last Microblog user circle in the circle set, or execute step 210 if the currently scanned Microblog user circle is not the last Microblog user circle in the circle set.

Step 210: Start scan from a next Microblog user circle in the circle set, calculate a circle distance between the Microblog user circle currently pointed to by the pointer and the scanned Microblog user circle, and return step 208.

Step 211: Merge the circle currently pointed to by the pointer and the scanned Microblog user circle.

Step 212: Determine whether the circle pointed to by the pointer is the last Microblog user circle in the circle set, execute step 213 if the circle pointed to by the pointer is the last Microblog user circle, or move the pointer to a next Microblog user circle in the circle set if the circle pointed to by the pointer is not the last Microblog user circle in the circle set and return to step 207.

For example, there are five Microblog user circles, namely, A, B, C, D, and E. First, a circle set including the five Microblog user circles is formed, and the pointer is set to point to the Microblog user circle A. Scan is started from the Microblog user circle B among the remaining Microblog user circles, and a circle distance between the Microblog user circle A and the Microblog user circle B is calculated. If the circle distance between the Microblog user circle A and Microblog user circle B is less than a preset circle distance threshold, the Microblog user circle A and the Microblog user circle B are merged, and the pointer is moved to point to the Microblog user circle C. Scan is started from the Microblog user circle D. If the circle distance the Microblog user circle A and the Microblog user circle B is greater than or equal to the preset circle distance threshold, a next Microblog user circle, namely, the Microblog user circle C, among the Microblog user circles is scanned, until the last Microblog user circle E in the circle set is scanned; at this time, the pointer is set to point to the Microblog user circle B, and scan is started from the Microblog user circle C, and is ended when the Microblog user circle pointed to by the pointer is the last circle E in the circle set.

Step 213: Acquire an attribute of the Microblog user circle, and display the Microblog user circle to Microblog users in the Microblog user circle, so that the Microblog users in the Microblog user circle communicate with each other.

Specifically, Microblog topics in which the Microblog users in the Microblog user circle are interested are acquired from the Microblog server, the number of Microblog users interested in each Microblog topic is counted in the Microblog user circle, a preset number of Microblog topics having a largest number of Microblog users is selected, and the selected one or more Microblog topics are determined as the attribute of the Microblog user circle.

One Microblog user circle may have multiple attributes according to a preset quantity value.

The displaying the Microblog user circle to the Microblog users in the Microblog user circle may be:

forming a list of all Microblog users in the Microblog user circle, and displaying the list to each Microblog user in the Microblog user circle, where any Microblog user may select another Microblog user displayed in the list and communicate with the selected Microblog user, and therefore, the interactivity of Microblog is improved.

In this embodiment of the present invention, original Microblog data of a Microblog user is acquired, intimacy scores of the Microblog user with respect to other Microblog users are calculated according to the original Microblog data, and then a Microblog user circle is formed by clustering the Microblog users according to the intimacy scores and is displayed to each Microblog user in the Microblog user circle. The Microblog user circle is formed according to the intimacy scores, the Microblog users in the Microblog user circle are Microblog users having a high degree of intimacy, and the Microblog users are willing to interact and communicate with each other. Moreover, for any Microblog user in the Microblog user circle, Microblog users in the Microblog user circle may be Microblog users other than friends that the Microblog user follows, so that the Microblog user can interact with other Microblog users in addition to the friends followed, which improves the interactivity of Microblog.

Embodiment 3

Figure 3:
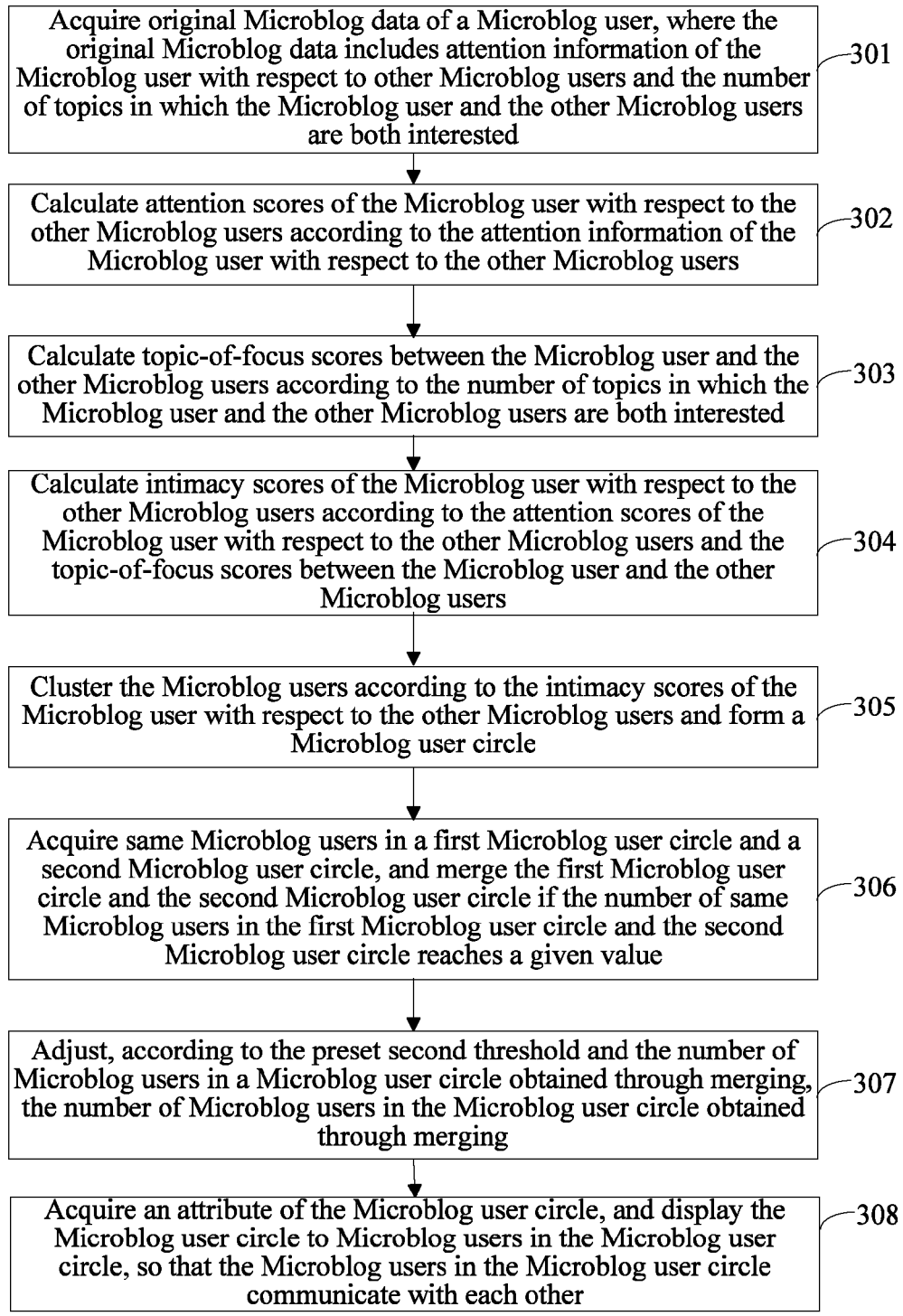
FIG. 3 is a method for mining community users according to Embodiment 3 of the present invention.

This embodiment of the present invention provides a method for mining community users. In this embodiment of the present invention, an example in which Microblog serves as the community is used for description, and the method provided in this embodiment of the present invention is used to mine Microblog users. Referring to FIG. 3, the method includes:

Step 301 to step 304, which are separately the same as step 201 to step 204 in Embodiment 2 and are not described in detail herein again.

Step 305: Cluster the Microblog users according to the intimacy scores of the Microblog user with respect to the other Microblog users and form a Microblog user circle.

Specifically, this step may specifically include the following step (1) to step (4):

(1): Scan a Microblog user, form a first user set of other Microblog users, and calculate user distances between the scanned Microblog user and Microblog users in the first user set according to intimacy scores of the scanned Microblog user with respect to the Microblog users in the first user set and intimacy score of the Microblog users in the first user set with respect to the scanned Microblog user.

Specifically, a Microblog user is scanned, a first user set of other Microblog users is formed, and user distances between the scanned Microblog user and Microblog users in the first user set are calculated according to intimacy scores of the scanned Microblog user with respect to the Microblog users in the first user set, intimacy scores of the Microblog users in the first user set with respect to the scanned Microblog user, and formula (9):

$$\text{dis}(i,j) = \text{dis\_score}(i,j) * \text{dis\_score}(j,i) \quad (9)$$

where dis(i,j) is a function for a user distance between a scanned Microblog user and a Microblog user in the first user set, i is the scanned Microblog user, j is any Microblog user in the first user set, dis_score(i, j) is an intimacy score of the scanned Microblog user with respect to the Microblog user in the first user set, and dis_score(j,i) is an intimacy score of the Microblog user in the first user set with respect to the scanned Microblog user. (2): Select, from the first user set, a Microblog user having a smallest user distance to the Microblog user, form a second user set of the Microblog user and the selected Microblog user, acquire the number of edges between each unselected Microblog user in the first user set and the second user set, select a Microblog user having a largest number of edges with the second user set, and count the number of Microblog users having a largest number of edges.

When a user distance between two Microblog users is less than a preset user distance threshold, the two Microblog users are valid edges to each other, where the value of the preset user distance threshold is set according to an actual situation, and a smaller preset user distance threshold indicates that the Microblog user has a smaller number of edges.

When a user distance between a Microblog user A and a Microblog user B is less than the preset user distance threshold, the Microblog user A and the Microblog user B are valid edges to each other. If the second user set includes two Microblog users, and user distances from a Microblog user in the first user set to the two Microblog users in the second user set are both less than the preset distance threshold, the number of edges of the Microblog user in the first user set is 2.

(3): Add the Microblog user having a largest number of edges to the second user set if the number of Microblog users having a largest number of edges obtained through count is not zero, calculate the number of edges between any Microblog user in the second user set and each of other Microblog users in the second user set, select a Microblog user having a smallest number of edges, and remove the Microblog user having a smallest number of edges from the second user set if the number of Microblog users having a smallest number of edges is less than half of the number obtained through count.

If the number of Microblog users having a largest number edges obtained through count is zero, it indicates that two Microblog users having a smallest user distance in the second user set do not belong to any circle.

(4): Judge the number of Microblog users in the second user set, execute step (8) if the number of Microblog users in the second user set is greater than or equal to a preset first threshold and less than or equal to a preset second threshold, execute step (5) if the number of Microblog users in the second user set is less than the preset first threshold, or execute step (6) if the number of Microblog users in the second user set is greater than the preset second threshold.

The values of the preset first threshold and the preset second threshold are set according to an actual situation, and the values of the preset first threshold and the preset second threshold determine the number of Microblog users in the user set.

(5): Acquire the number of edges between each unselected Microblog user in the first user set and the second user set, select a Microblog user having a largest number of edges with the second user set, count the number of Microblog users having a largest number of edges, execute step (8) if the number of Microblog users having a largest number of edges obtained through count is zero, or return to step (3) if the number obtained through count is not zero.

If the number of Microblog users having a largest number of edges obtained through count is zero, it indicates that the second user set has been extended to its boundary.

(6) Calculate the number of edges between any Microblog user in the second user set and each of other Microblog users in the second user set, select a Microblog user having a smallest number of edges, and remove the selected Microblog user from the second user set.

(7): Judge the number of Microblog users in the second user set, execute step (6) if the number of Microblog users in the second user set is greater than the preset second threshold, or execute step (8) if the number of Microblog users in the second user set is less than or equal to the preset second threshold.

(8): Cluster the Microblog users in the second user set to form a Microblog user circle.

Step 306: Acquire same Microblog users in a first Microblog user circle and a second Microblog user circle, and merge the first Microblog user circle and the second Microblog user circle if the number of same Microblog users in the first Microblog user circle and the second Microblog user circle reaches a given value.

Specifically, same Microblog users in a first Microblog user circle and a second Microblog user circle are acquired, where the first Microblog user circle and the second Microblog user circle are any two Microblog user circles; a first percentage that the same Microblog users account for in the first Microblog user circle and a second percentage that the same Microblog users account for in the second Microblog user circle are calculated; and the first Microblog user circle and the second Microblog user circle are merged if the first percentage and/or the second percentage is greater than a preset percentage.

Step 307: Adjust, according to the preset second threshold and the number of Microblog users in a Microblog user circle obtained through merging, the number of Microblog users in the Microblog user circle obtained through merging.

Specifically, after the first Microblog user circle and the second Microblog user circle are merged, the number of edges between any Microblog user in the circle obtained through merging and each of other Microblog users in the circle obtained through merging is calculated; a Microblog user having a smallest number of edges is selected and removed from the circle obtained through merging; and the foregoing process is repeated if the number of Microblog users in the circle obtained through merging is greater than the preset second threshold, until the number of Microblog users in the circle obtained through merging is less than or equal to the preset second threshold.

The number of Microblog users in the circle may be adjusted by adjusting the preset second threshold.

Step 308: Acquire an attribute of the Microblog user circle, and display the Microblog user circle to Microblog users in the Microblog user circle, so that the Microblog users in the Microblog user circle communicate with each other.

Specifically, Microblog topics in which the Microblog users in the Microblog user circle are interested are acquired from the Microblog server, the number of Microblog users interested in each Microblog topic is counted in the Microblog user circle, a preset number of Microblog topics having a largest number of Microblog users is selected, and the selected one or more Microblog topics are determined as the attribute of the Microblog user circle.

One Microblog user circle may have multiple attributes according to a preset quantity value.

The displaying the Microblog user circle to Microblog users in the Microblog user circle may be:
forming a list of all Microblog users in the Microblog user circle, and displaying the list to each Microblog user in the Microblog user circle, where any Microblog user may select another Microblog user displayed in the list and communicate with the selected Microblog user, and therefore, the interactivity of Microblog is improved.

In this embodiment of the present invention, original Microblog data of a Microblog user is acquired, intimacy scores of the Microblog user with respect to other Microblog users are calculated according to the original Microblog data, and then a Microblog user circle is formed by clustering the Microblog users according to the intimacy scores and is displayed to each Microblog user in the Microblog user circle. The Microblog user circle is formed according to the intimacy scores, the Microblog users in the Microblog user circle are Microblog users having a high degree of intimacy, and the Microblog users are willing to interact and communicate with each other. Moreover, for any Microblog user in the Microblog user circle, Microblog users in the Microblog user circle may be Microblog users other than friends that the Microblog user follows, so that the Microblog user can interact with other Microblog users in addition to the friends followed, which improves the interactivity of Microblog.

Embodiment 4

Figure 4:
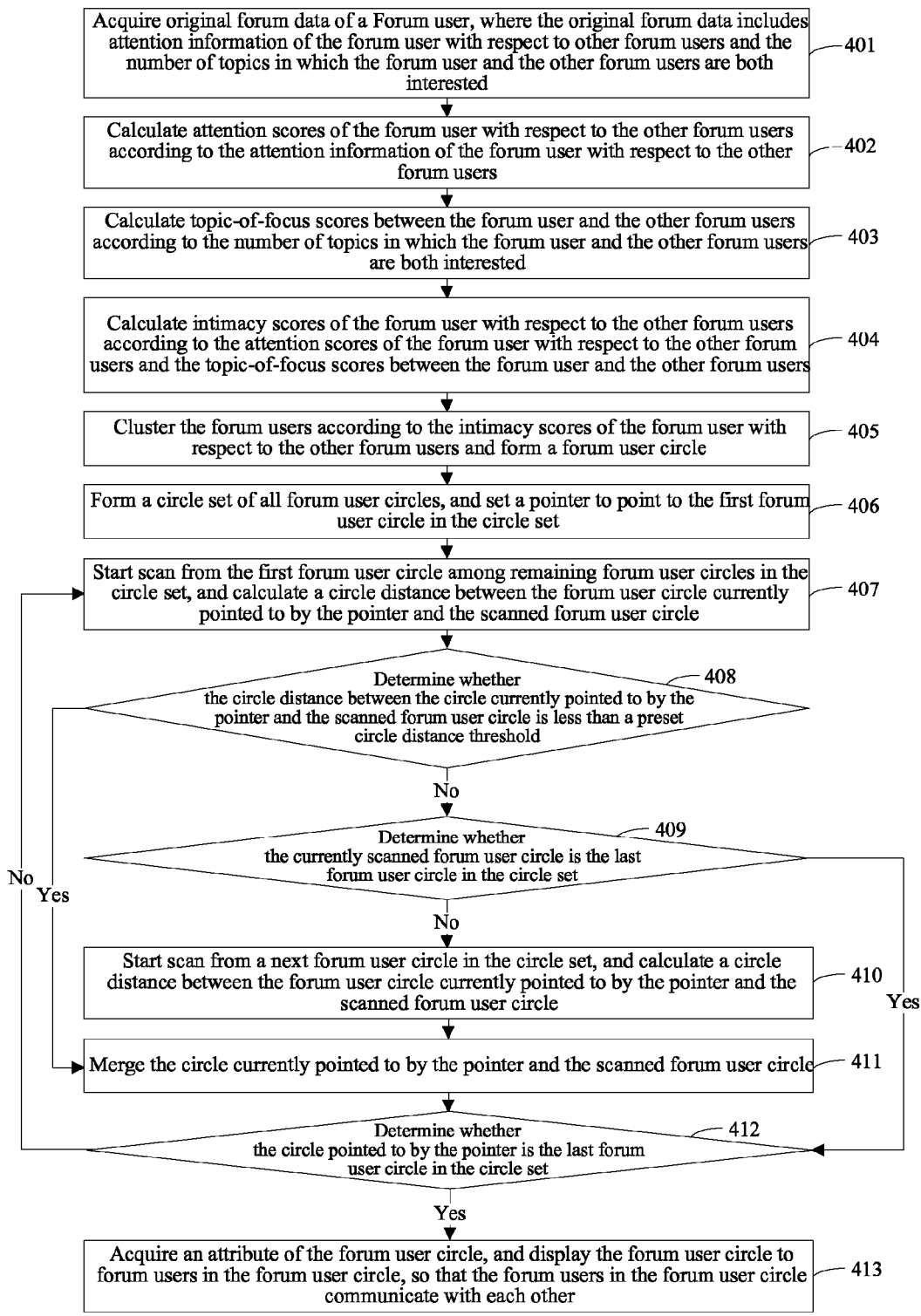
FIG. 4 is a method for mining community users according to Embodiment 4 of the present invention.

This embodiment of the present invention provides a method for mining community users. In this embodiment of the present invention, an example in which a forum serves as the community is used for description, and the method provided in this embodiment of the present invention is used to mine forum users. Referring to FIG. 4, the method includes:

Step 401: Acquire original forum data of a forum user, where the original forum data includes attention information of the forum user with respect to other forum users and the number of topics in which the forum user and the other forum users are all interested.

Specifically, the attention information of the forum user with respect to other forum users and the number of topics in which the forum user and the other forum users are all interested are acquired.

The attention information of the forum user with respect to the other forum users includes: the number of times the forum user replies to posts of the other forum users, the number of times the forum user sends information to the other forum users and/or the number of times the forum user sends private messages to the other forum users.

In this embodiment of the present invention, a forum stores the number of times each forum user replies to posts of other forum users, the number of times each forum user sends information to other forum users, the number of times each forum user sends private messages to other forum users, and forum topics that each forum user is interested in.

Therefore, in this embodiment of the present invention, for any forum user, the number of times the forum user replies to posts of other forum users, the number of times the forum user sends information to other forum users, the number of times the forum user sends private messages to other forum users, and/or forum topics that the forum user is interested in may be acquired from the forum server, and forum topics in which the forum user and the other forum users are all interested are acquired according to the forum topics in which the forum user is interested and forum topics in which the other forum users are interested.

Step 402: Calculate attention scores of the forum user with respect to the other forum users according to the attention information of the forum user with respect to the other forum users.

The attention scores of the forum user with respect to the other forum users include: post reply scores regarding replies of the forum user to posts of the other forum users, information sending scores regarding sending of information to the other forum users and/or private message sending scores regarding sending of private messages by the forum user to the other forum users.

Calculating post reply scores regarding replies of the forum user to posts of the other forum users according to the number of times the forum user replies to posts of the other forum users may be:
calculating post reply scores regarding replies of the forum user to posts of the other forum users according to the number of times the forum user replies to posts of the other forum users and formula (10):

$$f(i,j)=x \qquad (10)$$

where f(i,j) is a function for a post reply score regarding replies of a forum user to posts of another forum user, i is the forum user, j is another forum user except the forum user, and x is the number of times the forum user i replies posts of the forum user j.

Calculating, according to the number of times the forum user sends information to the other forum users, information sending scores regarding sending of information by the forum user to the other forum users may be:
calculating, according to the number of times the forum user sends information to the other forum users and formula (11), information sending scores regarding sending of information by the forum user to the other forum users:

$$g(i,j)=x \qquad (11)$$

where g(i,j) is a function about the number of times a forum user sends information to another forum user, i is the forum user, j is another forum user except the forum user, and x is the number of times the forum user i sends information to the forum user j.

Calculating, according to the number of times the forum user sends private messages to the other forum users, private message sending scores regarding sending of private messages by the forum user to the other forum users may be:
calculating, according to the number of times the forum user sends private messages to the other forum users and formula (12), information sending scores regarding sending of private messages by the forum user to the other forum users:

$$h(i,j)=x \qquad (12)$$

where g(i,j) is a function about the number of times a forum user sends private messages to another forum user, i is the forum user, j is another forum user except the forum user, and x is the number of times the forum user i sends private messages to the forum user j.

Step 403: Calculate topic-of-focus scores between the forum user and the other forum users according to the number of topics in which the forum user and the other forum users are all interested.

Specifically, topic-of-focus scores between the forum user and the other forum users are calculated according to the number of topics in which the forum user and the other forum users are all interested and formula (13):

$$l(i,j,x)=x \qquad (13)$$

where l(i,j,x) is a function about a topic-of-focus score between a forum user and another forum users, i is the forum user, j is another forum user except the forum user, and x is the number of topics in which the forum user i and the forum user j are both interested.

Step 404: Calculate intimacy scores of the forum user with respect to the other forum users according to the attention scores of the forum user with respect to the other forum users and the topic-of-focus scores between the forum user and the other forum users.

The intimacy scores are used for indicating degrees of intimacy of the forum user with respect to the other forum users.

Specifically, intimacy scores of the forum user with respect to the other forum users are calculated according to the attention scores of the forum user with respect to the other forum users, the topic-of-focus scores between the forum user and the other forum users, and formula (14):

$$\mathrm{dis\_score}(i,j) = \frac{1}{\beta*f(i,j)+\gamma*g(i,j)+\delta*h(i,j)+\varepsilon*l(i,j)} \qquad (14)$$

where dis_score(i,j) is a function about an intimacy score of a user with respect to another forum user, i is the forum user, j is another forum user except the forum user, f(i, j) is a function about a post reply score, g(i, j) is a function about an information sending score, h(i, j) is a function about a private message sending score, l(i, j, x) is a function about a topic-of-focus score, and $\beta+\gamma+\delta+\varepsilon=1$; the value of one or more of $\alpha$, $\beta$, $\gamma$, $\delta$, and $\varepsilon$ may be set to zero, and when the value is set to zero, it is unnecessary to calculate the score in the related function.

A smaller intimacy score of a forum user with respect to another forum user indicates that the forum user is more intimate with the another forum user, and a larger intimacy score indicates that the forum user is less intimate with the another forum user.

Step 405: Cluster the forum users according to the intimacy scores of the forum user with respect to the other forum users and form a forum user circle.

Specifically, this step may be executed with reference to step 205 in Embodiment 2, and is not described in detail herein again.

Step 406: Form a circle set of all forum user circles, and set a pointer to point to the first forum user circle in the circle set.

Step 407: Start scan from the first forum user circle among remaining forum user circles in the circle set, and calculate a circle distance between the forum user circle currently pointed to by the pointer and the scanned forum user circle.

Specifically, this step may be executed with reference to step 207 in Embodiment 2, and is not described in detail herein again.

Step 408: Determine whether the circle distance between the circle currently pointed to by the pointer and the scanned forum user circle is less than a preset circle distance threshold, execute step 411 if the circle distance between the circle currently pointed to by the pointer and the scanned forum user circle is less than the preset circle distance threshold, or execute step 409 if the circle distance between the circle currently pointed to by the pointer and the scanned forum user circle is greater than or equal to the preset circle distance threshold.

Step 409: Determine whether the currently scanned forum user circle is the last forum user circle in the circle set, execute step 412 if the currently scanned forum user circle is the last forum user circle in the circle set, or execute step 410 if the currently scanned forum user circle is not the last forum user circle in the circle set.

Step 410: Start scan from a next forum user circle in the circle set, calculate a circle distance between the forum user circle currently pointed to by the pointer and the scanned forum user circle, and return step 408.

Step 411: Merge the circle currently pointed to by the pointer and the scanned forum user circle.

Step 412: Determine whether the circle pointed to by the pointer is the last forum user circle in the circle set, execute step 413 if the circle pointed to by the pointer is the last forum user circle, or move the pointer to a next forum user circle in the circle set if the circle pointed to by the pointer is not the last forum user circle in the circle set, and return to step 407.

Step 413: Acquire an attribute of the forum user circle, and display the forum user circle to forum users in the forum user circle, so that the forum users in the forum user circle communicate with each other.

Specifically, forum topics in which the forum users in the forum user circle are interested are acquired from the forum server, the number of forum users interested in each forum topic is counted in the forum user circle, a preset number of forum topics having a largest number of forum users is selected, and the selected one or more topics are determined as the attribute of the forum user circle.

One forum user circle may have multiple attributes according to a preset quantity value.

The displaying the forum user circle to forum users in the forum user circle may be:
forming a list of all forum users in the forum user circle, and displaying the list to each forum user in the forum user circle, where any forum user may select another forum user displayed in the list and communicate with the selected forum user, and therefore, the interactivity of the forum is improved.

In this embodiment of the present invention, original forum data of a forum user is acquired, intimacy scores of the forum user with respect to other forum users are calculated according to the original forum data, and then a forum user circle is formed by clustering the forum users according to the intimacy scores and is displayed to each forum user in the forum user circle. The forum user circle is formed according to the intimacy scores, the forum users in the forum user circle are forum users having a high degree of intimacy, and the forum users are willing to interact and communicate with each other. Moreover, for any forum user in the forum user circle, forum users in the forum user circle may be forum users other than friends that the forum user follows, so that the forum user can interact with other forum users in addition to the friends followed, which improves the interactivity of forum.

Embodiment 5

Figure 5:
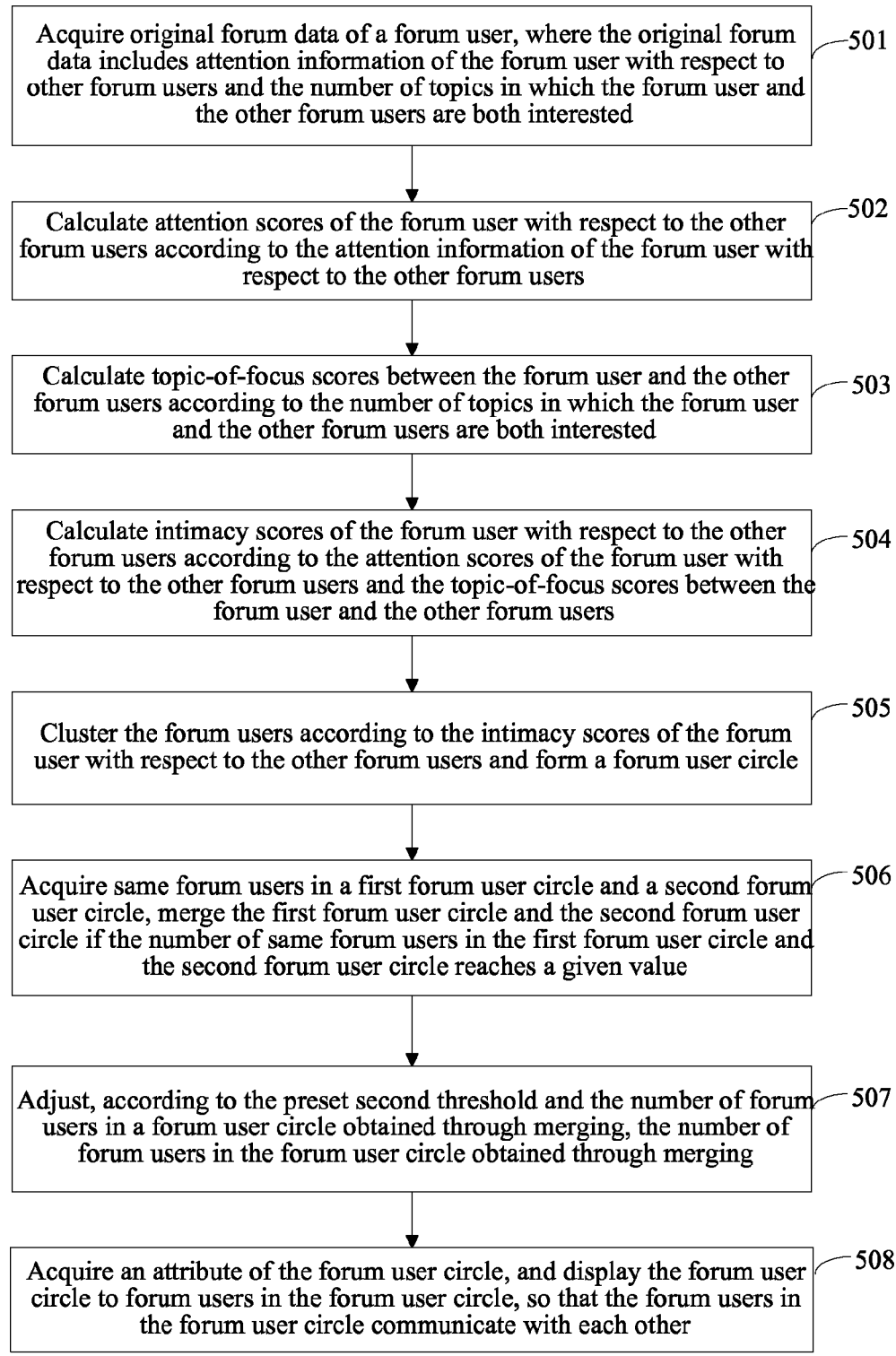
FIG. 5 is a method for mining community users according to Embodiment 5 of the present invention.

This embodiment of the present invention provides a method for mining community users. In this embodiment of the present invention, an example in which a forum serves as the community is used for description, and the method provided in this embodiment of the present invention is used to mine forum users. Referring to FIG. 5, the method includes:

Step 501 to step 504, which are separately the same as step 401 to step 404 in Embodiment 4 and are not described in detail herein again.

Step 505: Cluster the forum users according to the intimacy scores of the forum user with respect to the other forum users and form a forum user circle.

Specifically, this step may be executed with reference to step 305 in Embodiment 3, and is not described in detail herein again.

Step 506: Acquire same forum users in a first forum user circle and a second forum user circle, and merge the first forum user circle and the second forum user circle if the number of same forum users in the first forum user circle and the second forum user circle reaches a given value.

Specifically, same forum users in a first forum user circle and a second forum user circle are acquired, where the first forum user circle and the second forum user circle are any two forum user circles; a first percentage that the same forum users account for in the first forum user circle and a second percentage that the same forum users account for in the second forum user circle are calculated; and the first forum user circle and the second forum user circle are merged if the first percentage and/or the second percentage is greater than a preset percentage.

Step 507: Adjust, according to the preset second threshold and the number of forum users in a forum user circle obtained through merging, the number of forum users in the forum user circle obtained through merging.

Specifically, after the first forum user circle and the second forum user circle are merged, the number of edges between any forum user in the circle obtained through merging and each of other forum users in the circle obtained through merging is calculated; a forum user having a smallest number of edges is selected and removed from the circle obtained through merging; and the foregoing process is repeated if the number of forum users in the circle obtained through merging is greater than the preset second threshold, until the number of forum users in the circle obtained through merging is less than or equal to the preset second threshold.

The number of forum users in the circle may be adjusted by adjusting the preset second threshold.

Step 508: Acquire an attribute of the forum user circle, and display the forum user circle to forum users in the forum user circle, so that the forum users in the forum user circle communicate with each other.

Specifically, forum topics in which the forum users in the forum user circle are interested are acquired from the forum server, the number of forum users interested in each forum topic is counted in the forum user circle, a preset number of forum topics having a largest number of forum users is selected, and the selected one or more topics are determined as the attribute of the forum user circle.

One forum user circle may have multiple attributes according to a preset quantity value.

The displaying the forum user circle to forum users in the forum user circle may be:
forming a list of all forum users in the forum user circle, and displaying the list to each forum user in the forum user circle, where any forum user may select another forum user displayed in the list and communicate with the selected forum user, and therefore, the interactivity of the forum is improved.

In this embodiment of the present invention, original forum data of a forum user is acquired, intimacy scores of the forum user with respect to other forum users are calculated according to the original forum data, and then a forum user circle is formed by clustering the forum users according to the intimacy scores and is displayed to each forum user in the forum user circle. The forum user circle is formed according to the intimacy scores, the forum users in the forum user circle are forum users having a high degree of intimacy, and the forum users are willing to interact and communicate with each other. Moreover, for any forum user in the forum user circle, forum users in the forum user circle may be forum users other than friends that the forum user follows, so that the forum user can interact with other forum users in addition to the friends followed, which improves the interactivity of forum.

Embodiment 6

Figure 6:
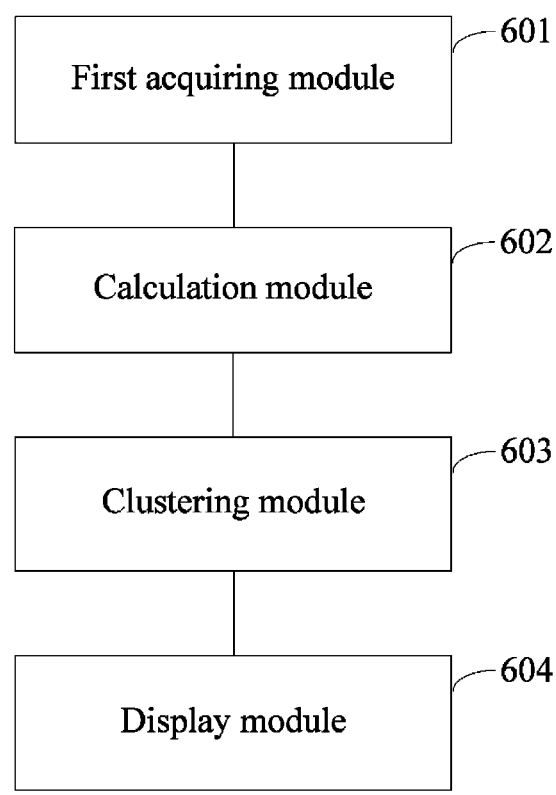
FIG. 6 is an apparatus for mining community users according to Embodiment 6 of the present invention.

This embodiment of the present invention provides an apparatus for mining community users; referring to FIG. 6, the apparatus includes:

a first acquiring module 601, configured to acquire original community data of a community user, the original community data of the community user including attention information of the community user with respect to other community users and the number of topics in which the community user and the other community users are all interested;

a calculation module 602, configured to calculate intimacy scores of the community user with respect to the other community users according to the original community data of the community user, the intimacy scores being used for indicating degrees of intimacy of the community user with respect to the other community users;

a clustering module 603, configured to cluster the community users according to the intimacy scores of the community user with respect to the other community users, and form a community user circle; and a display module 604, configured to display the community user circle to community users in the community user circle, so that the community users in the community user circle communicate with each other.

The calculation module 601 includes:
a first calculation unit 6011, configured to calculate attention scores of the community user with respect to the other community users according to the attention information of the community user with respect to the other community users;
a second calculation unit 6012, configured to calculate topic-of-focus scores between the community user and the other community users according to the number of topics in which the community user and the other community users are all interested; and a third calculation unit 6013, configured to calculate the intimacy scores of the community user with respect to the other community users according to the attention scores of the community user with respect to the other community users and the topic-of-focus scores between the community user and the other community users.

The clustering module 603 includes:
a first scan unit 6031, configured to scan a community user;
a fourth calculation unit 6032, configured to calculate, according to intimacy scores of the scanned community user with respect to other community users except the scanned community user and intimacy scores of the other community users with respect to the scanned community user, user distances between the scanned community user and the other community users; and
a first clustering unit 6033, configured to select a community user whose user distance to the scanned community user is less than a preset user distance threshold, and cluster the scanned community user and the selected community user to form a community user circle.

Further, the apparatus further includes:
a first merging module 605, configured to form, after the scanned community user and the selected community user are clustered to form a circle, a circle set of all community user circles, set a pointer to point to the first community user circle in the circle set, and start scan from the first community user circle among remaining community user circles in the circle set;
calculate a circle distance between the community user circle pointed to by the pointer and the scanned community user circle according to intimacy scores of community users in the community user circle pointed to by the pointer with respect to community users in the scanned community user circle and degrees of intimacy of the community users in the scanned community user circle with respect to the community users in the community user circle pointed to by the pointer; and
merge the community user circle pointed to by the pointer and the scanned community user circle if the circle distance is less than a preset circle distance threshold.

Further, the apparatus further includes:
a first scan module 606, configured to set the pointer to point to a next community user circle in the circle set if the community user circle pointed to by the pointer is not the last community user circle in the circle set, and start scan from the first community user circle among remaining community user circles in the circle set.

Further, the apparatus further includes:
a second scan module 607, configured to scan a next community user circle among the remaining community user circles in the circle set if the circle distance is greater than or equal to the preset circle distance threshold and the scanned community user circle is not the last community user circle among the remaining community user circles in the circle set; and
a third scan module 608, configured to set the pointer to point to a next community user circle in the circle set if the circle distance is greater than or equal to the preset circle distance threshold, the scanned community user circle is the last community user circle among the remaining community user circles in the circle set, and the community user circle pointed to by the pointer is not the last community user circle in the circle set, and start scan from the first community user circle among the remaining community user circles in the circle set.

The clustering module 603 further includes:
a second scan unit 6034, configured to scan a community user, form a first user set of the other community users, and calculate user distances between the scanned community user and the community users in the first user set according to intimacy scores of the scanned community user with respect to the community users in the first user set and intimacy scores of the community users in the first user set with respect to the scanned community user;
a first selection unit 6035, configured to select, from the first user set, a community user having a smallest user distance to the community user, cluster the community user and the selected community user to form a second user set, acquire the number of edges between each unselected community user in the first user set and the second user set, select a community user having a largest number of edges with the second user set, and count the number of community users having a largest number of edges;
a second selection unit 6036, configured to add the community user having a largest number of edges to the second user set if the number obtained through count is not zero, calculate the number of edges between any community user in the second user set and each of other community users in the second user set, select a community user having a smallest number of edges, and remove the community user having a smallest number of edges from the second user set if the number of community users having a smallest number of edges is less than half of the number obtained through count; and
a second clustering unit 6037, configured to judge the number of community users in the second user set, and cluster the community users in the second user set to form a community user circle if the number of community users in the second user set is greater than or equal to a preset first threshold and is less than or equal to a preset second threshold.

The clustering module 603 further includes:
a third clustering unit 6038, configured to acquire the number of edges between each unselected community user in the first user set and the second user set if the number of community users in the second user set is less than the preset first threshold, select a community user having a largest number of edges with the second user set, count the number of community users having a largest number of edges, cluster the community users in the second user set to form a community user circle if the number obtained through count is zero, or execute the steps of the second selection unit and the second clustering unit if the number obtained through count is not zero.

The clustering module 603 further includes:
a fourth clustering unit 6039, configured to calculate the number of edges between any community user in the second user set and each of other community users in the second user set if the number of community users in the second user set is greater than the preset second threshold, select a community user having a smallest number edges and remove the selected community user from the second user set; repeat the foregoing process if the number of community users in the second user set is greater than the preset second threshold, until the number of community users in the second user set is less than or equal to the preset second threshold, and cluster the community users in the second user set to form a community user circle.

Further, the apparatus further includes:
a second merging module 609, configured to acquire same community users from a first community user circle and a second community user circle after the community users in the second user set are clustered to form a community user circle, where the first community user circle and the second community user circle are any two community user circles, calculate a first percentage that the acquired community users account for in the first community user circle and a second percentage that the acquired community users account for in the second community user circle, and merge the first community user circle and the second community user circle if the first percentage and/or the second percentage is greater than a preset percentage.

Further, the apparatus further includes:

a second acquiring module 610, configured to acquire, after the community users are clustered to form the community user circle, community topics in which the community users in the community user circle are interested, count the number of community users interested each community topic in the community user circle, select a preset number of community topics having a largest number of community users, and determine the selected one or more community topics as an attribute of the community user circle.

In this embodiment of the present invention, the community may be Microblog, a forum, or a network zone.

In the embodiments of the present invention, original community data of a community user is acquired, intimacy scores of the community user with respect to other community users are calculated according to the original community data, and then a community user circle is formed by clustering the community users according to the intimacy scores and is displayed to each community user in the community user circle. The community user circle is formed according to the intimacy scores, the community users in the community user circle are community users having a high degree of intimacy, and the community users are willing to interact and communicate with each other. Moreover, for any community user in the community user circle, community users in the community user circle may be community users other than friends that the community user follows, so that the community user can interact with other community users in addition to the friends followed, which improves the interactivity of a community.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

Figure 7:
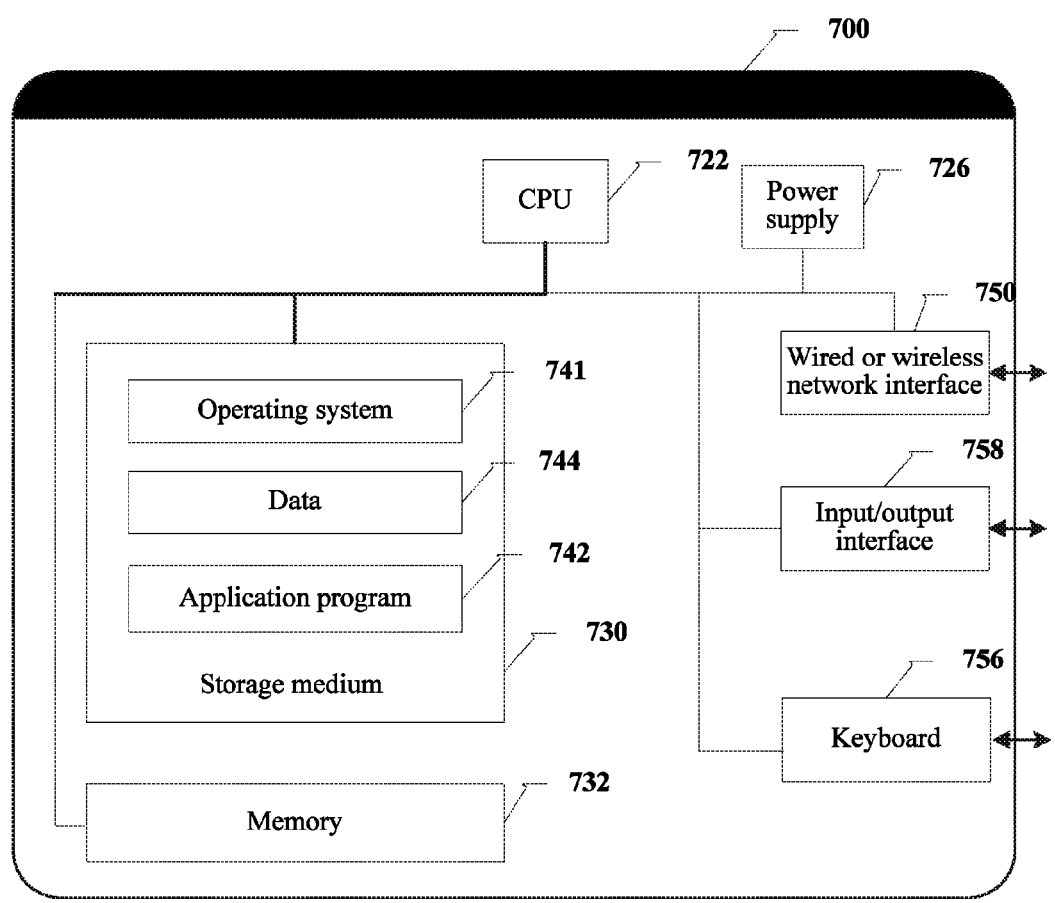
FIG. 7 is a schematic structural diagram of a server according to an embodiment of the present invention.

The method for mining community users described in the foregoing embodiments may be executed by using the following architecture described in FIG. 7. FIG. 7 is a schematic structural diagram of a server according to an embodiment of the present invention. The server 700 may differ a lot due to different configurations or performance, and may include one or more central processing units (CPUs) 722 (for example, one or more processors), a memory 732, one or more storage media 742 (for example, one or more massive storage devices) for storing an application program 744 or data 730. The memory 732 and the storage medium 730 may be temporary storage or permanent storage. The program stored in the storage medium 730 may include one or more modules (not shown in the figure), and each module may include a series of instruction operations on the server. Further, the CPU 722 may be configured to communicate with the storage medium 730, and execute, on the server 700, a series of instruction operations in the storage medium 730. The server 700 may further include one or more power supplies 726, one or more wired or wireless network interfaces 750, one or more input/output interfaces 758, one or more keyboards 756, and/or, one or more operating systems 741, for example, Windows Server™, Mac OS X™, Unix™, Linux™, and FreeBSD™.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A method for mining community users performed by a processor by executing instructions stored in a memory, comprising:

acquiring original community data of a community user, the original community data of the community user comprising attention information of the community user with respect to other community users and the number of topics in which the community user and the other community users are all interested;

calculating intimacy scores of the community user with respect to the other community users according to the original community data of the community user, the intimacy scores being used for indicating degrees of intimacy of the community user with respect to the other community users;

scanning a community user;

calculating, according to intimacy scores of the scanned community user with respect to other community users except the scanned community user and intimacy scores of the other community users with respect to the scanned community user, user distances between the scanned community user and the other community users;

selecting a community user whose user distance to the scanned community user is less than a preset user distance threshold, and clustering the scanned community user and the selected community user to form a community user circle, wherein forming the community user circle is based upon clustering the community user according to the intimacy scores of the community user with respect to the other community user;

forming a circle set of all community user circles, setting a pointer to point to the first community user circle in the circle set, and starting scan from the first community user circle among remaining community user circles in the circle set;

calculating a circle distance between the community user circle pointed to by the pointer and the scanned community user circle according to intimacy scores of community users in the community user circle pointed to by the pointer with respect to community users in the scanned community user circle and degrees of intimacy of the community users in the scanned community user circle with respect to the community users in the community user circle pointed to by the pointer;

merging the community user circle pointed to by the pointer and the scanned community user circle if the circle distance is less than a preset circle distance threshold; and displaying the community user circle to community users in the community user circle, so that the community users in the community user circle communicate with each other.

2. The method according to claim 1, wherein the calculating intimacy scores of the community user with respect to the other community users according to the original community data of the community user comprises:
- calculating attention scores of the community user with respect to the other community users according to the attention information of the community user with respect to the other community users;
- calculating topic-of-focus scores between the community user and the other community users according to the number of topics in which the community user and the other community users are all interested; and
- calculating the intimacy scores of the community user with respect to the other community users according to the attention scores of the community user with respect to the other community users and the topic-of-focus scores between the community user and the other community users.

3. The method according to claim 1, after the merging the community user circle pointed to by the pointer and the scanned community user circle, further comprising:
- setting the pointer to point to a next community user circle in the circle set if the community user circle pointed to by the pointer is not the last community user circle in the circle set, and starting scan from the first community user circle among remaining community user circles in the circle set.

4. The method according to claim 1, wherein if the circle distance is greater than or equal to the preset circle distance threshold, the method further comprises:
- scanning a next community user circle among remaining community user circles in the circle set if the scanned community user circle is not the last community user circle among the remaining community user circles in the circle set; and
- setting the pointer to point to a next community user circle in the circle set if the scanned community user circle is the last community user circle among the remaining community user circles in the circle set and the community user circle pointed to by the pointer is not the last community user circle in the circle set, and starting scan from the first community user circle among the remaining community user circles in the circle set.

5. The method according to claim 1, after the clustering the community users and forming a community user circle, further comprising:
- acquiring community topics in which community users in the community user circle are interested, counting the number of community users interested in each community topic in the community user circle, selecting a preset number of community topics in which a largest number of community users is interested, and determining the selected one or more community topics as an attribute of the community user circle.

6. An apparatus for mining community users, comprising a memory and a processor communicating with the memory, the memory being configured to store instructions that when executed by the processor configure the apparatus to:
- acquire original community data of a community user, the original community data of the community user comprising attention information of the community user with respect to other community users and the number of topics in which the community user and the other community users are all interested;
- calculate intimacy scores of the community user with respect to the other community users according to the original community data of the community user, the intimacy scores being used for indicating degrees of intimacy of the community user with respect to the other community users;
- scan a community user;
- calculate, according to intimacy scores of the scanned community user with respect to other community users except the scanned community user and intimacy scores of the other community users with respect to the scanned community user, user distances between the scanned community user and the other community users;
- select a community user whose user distance to the scanned community user is less than a preset user distance threshold, and cluster the scanned community user and the selected community user to form a community user circle, wherein forming the community user circle is based upon clustering the community user according to the intimacy scores of the community user with respect to the other community user;
- form a circle set of all community user circles, set a pointer to point to the first community user circle in the circle set, and start scan from the first community user circle among remaining community user circles in the circle set;
- calculate a circle distance between the community user circle pointed to by the pointer and the scanned community user circle according to intimacy scores of community users in the community user circle pointed to by the pointer with respect to community users in the scanned community user circle and degrees of intimacy of the community users in the scanned community user circle with respect to the community users in the community user circle pointed to by the pointer;
- merge the community user circle pointed to by the pointer and the scanned community user circle if the circle distance is less than a preset circle distance threshold; and
- display the community user circle to community users in the community user circle, so that the community users in the community user circle communicate with each other.

7. The apparatus according to claim 6, wherein the apparatus is further configured to:
- calculate attention scores of the community user with respect to the other community users according to the attention information of the community user with respect to the other community users;
- calculate topic-of-focus scores between the community user and the other community users according to the number of topics in which the community user and the other community users are all interested; and
- calculate the intimacy scores of the community user with respect to the other community users according to the attention scores of the community user with respect to the other community users and the topic-of-focus scores between the community user and the other community users.

8. The apparatus according to claim 6, wherein the apparatus is further configured to:
- set the pointer to point to a next community user circle in the circle set if the community user circle pointed to by the pointer is not the last community user circle in the circle set, and start scan from the first community user circle among remaining community user circles in the circle set.

9. The apparatus according to claim 6, wherein the apparatus is further configured to:

scan a next community user circle among the remaining community user circles in the circle set if the circle distance is greater than or equal to the preset circle distance threshold and the scanned community user circle is not the last community user circle among the remaining community user circles in the circle set; and set the pointer to point to a next community user circle in the circle set if the circle distance is greater than or equal to the preset circle distance threshold, the scanned community user circle is the last community user circle among the remaining community user circles in the circle set, and the community user circle pointed to by the pointer is not the last community user circle in the circle set, and start scan from the first community user circle among the remaining community user circles in the circle set.

* * * * *